United States Patent
Saito

(10) Patent No.: US 7,324,487 B2
(45) Date of Patent: Jan. 29, 2008

(54) WIRELESS LAN SYSTEM AND METHOD FOR ROAMING IN A MULTIPLE BASE STATION

(75) Inventor: Jun Saito, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 968 days.

(21) Appl. No.: 10/360,713

(22) Filed: Feb. 10, 2003

(65) Prior Publication Data

US 2003/0169716 A1    Sep. 11, 2003

(30) Foreign Application Priority Data

Feb. 12, 2002  (JP)  ............... 2002-034515

(51) Int. Cl.
*H04Q 7/24*       (2006.01)
(52) U.S. Cl. .............. 370/338; 370/320; 370/331; 370/342; 370/330; 370/395.3; 370/332; 455/436; 455/423; 455/445; 455/432.1; 455/435.1
(58) Field of Classification Search .............. 370/338, 370/320, 331, 342, 330, 395.3, 332; 455/436
See application file for complete search history.

(56) References Cited

U.S. PATENT DOCUMENTS

| | | | | |
|---|---|---|---|---|
| 5,854,786 | A * | 12/1998 | Henderson et al. | 370/335 |
| 6,591,099 | B1 * | 7/2003 | Syed et al. | 455/426.1 |
| 6,729,929 | B1 * | 5/2004 | Sayers et al. | 455/446 |
| 6,845,100 | B1 * | 1/2005 | Rinne | 370/395.43 |
| 6,901,258 | B2 * | 5/2005 | Rajkotia | 455/445 |
| 6,985,475 | B2 * | 1/2006 | Lee | 370/349 |
| 7,006,472 | B1 * | 2/2006 | Immonen et al. | 370/332 |
| 7,023,803 | B2 * | 4/2006 | Kakani et al. | 370/235 |
| 7,065,383 | B1 * | 6/2006 | Hovers et al. | 455/562.1 |
| 7,069,018 | B1 * | 6/2006 | Granstam et al. | 455/456.1 |
| 7,110,388 | B2 * | 9/2006 | Hameleers et al. | 370/349 |
| 7,171,206 | B2 * | 1/2007 | Wu | 455/438 |

* cited by examiner

*Primary Examiner*—Marceau Milord
(74) *Attorney, Agent, or Firm*—Mattingly, Stanger, Malur & Brundidge, P.C.

(57) ABSTRACT

In a wireless communication system including base transceiver stations connected to a wired network and wireless system terminals, the wireless system terminals are individually registered in a plurality of communicable base transceiver stations and at the same time set in a multilink connection state. Then, a base transceiver station that has a lower communication load and in a more stable communication state at current point in time is selected from among the multilink base transceiver stations connected to a wireless system terminal, thereby performing data communication with the wireless system terminal. With this arrangement, when an individual fixed connection is switched, no load is produced at the time of roaming, and stabilization of communication and balancing of communication loads resulting from switching of the base transceiver stations for use are realized. The throughput of the overall wireless communication system is thereby improved.

20 Claims, 13 Drawing Sheets

WIRELESS LAN SYSTEM AND METHOD FOR ROAMING IN A MULTIPLE BASE STATION

BACKGROUND OF THE INVENTION

The invention relates to the radio communication system, particularly effective technique applied to the radio communication system such as the wireless LAN (Local Area Network).

In a wireless communication system using a wireless communication technique such as a wireless LAN, constituted by a plurality of base transceiver stations (BTS) and a plurality of wireless system terminals, a wireless system terminal selects a base transceiver station with a highest receiving signal strength as a connecting destination. The receiving signal strength of the wireless system terminal changes incessantly. Thus, if a plurality of base transceiver stations having the same receiving signal strength is present, the wireless system terminal switches connection to a base transceiver station with the highest receiving signal strength one after another. This phenomenon is referred to as roaming. In order to perform this roaming, both of the base transceiver stations and the wireless system terminals allocate enormous computational resources to processing for switching a connecting destination. For this reason, communication throughput between the wireless system terminals and the base transceiver stations in the wireless communication system is reduced. Further, if most of the wireless system terminals in the system are connected to the base transceiver station with the highest receiving signal strength in unison, communication loads are concentrated onto one base transceiver station. Hence, the waiting periods of the wireless system terminals for communication sometimes become extremely extended.

Even if a lot of base transceiver stations are disposed, the throughput of the overall system will not be improved if communication is concentrated onto some of the base transceiver stations. It is thus necessary to evenly distribute communication loads throughout the base transceiver stations. However, in a method where wireless system terminals are dynamically assigned to base transceiver stations with low communication loads, it sometimes become necessary to perform a lot of processing for switching the connecting destination, thereby reducing the throughput. On the other hand, assume that the number of connected stations is just balanced. Then, even if 10 wireless system terminals are connected to each of two base transceiver stations, communication load balance cannot be achieved if wireless system terminals with large communication amounts are concentrated onto one base transceiver station and wireless system terminals with small communication amounts are concentrated on another base transceiver station.

The following are the more specific, conventional methods of reducing the frequency of roaming of a wireless system terminal and achieving communication load balance:

(1) Communication Load Monitoring Method

In this method, the wireless system terminal monitors communication loads on the respective base transceiver stations. When the communication load on the base transceiver station to which the wireless system terminal is connected has increased, roaming to other base transceiver station with a lower communication load is performed.

(2) Method of Checking Number of Connected Wireless System Terminals

Before establishing connection, the wireless system terminal inquires of the respective base transceiver stations the number of wireless system terminals connected thereto, and is connected to the base transceiver station with the smallest number of wireless system terminals connected thereto. When the receiving signal strength of the connected base transceiver station has been reduced, roaming to other wireless base station with a higher receiving signal strength is performed as necessary.

(3) Connecting Destination Registration Method

A single base transceiver station is registered in the wireless system terminal as a connecting destination, so that the connecting destination is fixed at one station, thereby disabling roaming. The number of wireless system terminals connected is thereby balanced artificially.

SUMMARY OF THE INVENTION

The challenge in the above-mentioned wireless communication system is to reduce the frequency of roaming of a wireless system terminal and evenly distribute communication load throughout a plurality of the base transceiver stations, thereby ensuring the optimal communication throughput of the wireless communication system.

In the above-mentioned communication load monitoring method, however, processing for switching the connecting destination might increase due to a rash of roaming of the wireless system terminal. The throughput might be thereby reduced.

On the other hand, in the method of checking the number of connected wireless system terminals, the number of the connected terminals is balanced. Thus, switching of the connecting destination is not performed according to the level of the communication load on the base transceiver station to which the wireless system terminal is connected. Accordingly, if the communication load on the base transceiver station to which the wireless system terminal is connected is high and communication loads on other base transceiver stations are low, communication load concentration cannot be resolved.

Furthermore, in the connecting destination registration method, the number of wireless system terminals is balanced. Thus, when the communication load on the base transceiver station to which the wireless system terminal is connected is high and communication loads on other base transceiver stations are low, communication load concentration cannot be resolved. In addition, in this method, the connecting destination of the wireless system terminal is fixed. Thus, even if the receiving signal strength of the base transceiver station to which the wireless system terminal is connected is reduced due to a failure or the like, roaming to other base transceiver station with a higher receiving signal strength cannot be performed. "Communication with the receiving signal strength held at low" means that the wireless system terminal and the base transceiver station communicate with each other in an unstable connection state. Under the unstable connection, the error rate of data communication increases. The throughput is thereby reduced.

As described above, even if communication load balance is achieved using the conventional communication load monitoring method and the conventional method of checking the number of connected wireless system terminals, processing for switching the connecting destination might increase due to a rash of roaming of the wireless system terminal, and communication load balance might become just balancing of the number of the connected wireless system terminals. Accordingly, the technical problem associated with communication load balance has not been solved yet. In the connecting destination registration method where a connecting destination is registered and held fixed at the wireless system terminal, even when the receiving signal strength of the base transceiver station is reduced due to balancing of the number of the connected wireless system terminals, the technical problem arises that the wireless system terminal cannot roam to a base transceiver station with a higher receiving signal strength.

It is therefore an object of the present invention to ensure stable communication in a wireless communication system constituted by a plurality of wireless system terminals and a plurality of base transceiver stations, by reducing the frequency of roaming of a wireless system terminal, achieving communication load balance among a plurality of base transceiver stations, and always connecting the wireless system terminal to a base transceiver station with a high receiving signal strength, so as to finally obtain an improvement in the throughput of the wireless communication system.

The fundamental reason why the technical problem associated with communication load balance is not solved in the conventional arts of the current wireless communication system is that a wireless system terminal is connected to a single base transceiver station alone at a certain point of time.

Further, the reason why the wireless system terminal cannot roam to other base transceiver station even in the unstable connection state is that the connecting destination of the wireless system terminal is fixed, so that once connection to the registered base transceiver station is established, the wireless system terminal cannot perform roaming.

According to the present invention, in order to solve the problems associated with the conventional arts, a multilink for a wireless system terminal is implemented. In this arrangement, control is performed such that one wireless system terminal is simultaneously connected to a plurality of base transceiver stations at a certain point of time. Control is also performed such that automatic switching of base transceiver stations to be used by the wireless system terminal for information communication is performed according to the loads of the respective base transceiver stations.

Hereinafter, the "multilink" is defined as simultaneous connection of a wireless system terminal to a plurality of base transceiver stations at a certain point of time.

With the multilink achieved according to the present invention, three effects of stable communication for a wireless system terminal, reduction in roaming of the wireless system terminal, and communication load balance are brought about. The throughput of the wireless communication system is thereby improved. Principles underlying the improvement in the throughput due to the respective effects will be described in detail, using the embodiment of the invention to be given below.

Other objects, features and advantages of the invention will become apparent from the following description of the embodiments of the invention taken in conjunction with the accompanying drawings.

DETAILED DESCRIPTION OF THE EMBODIMENTS

Figure 1:
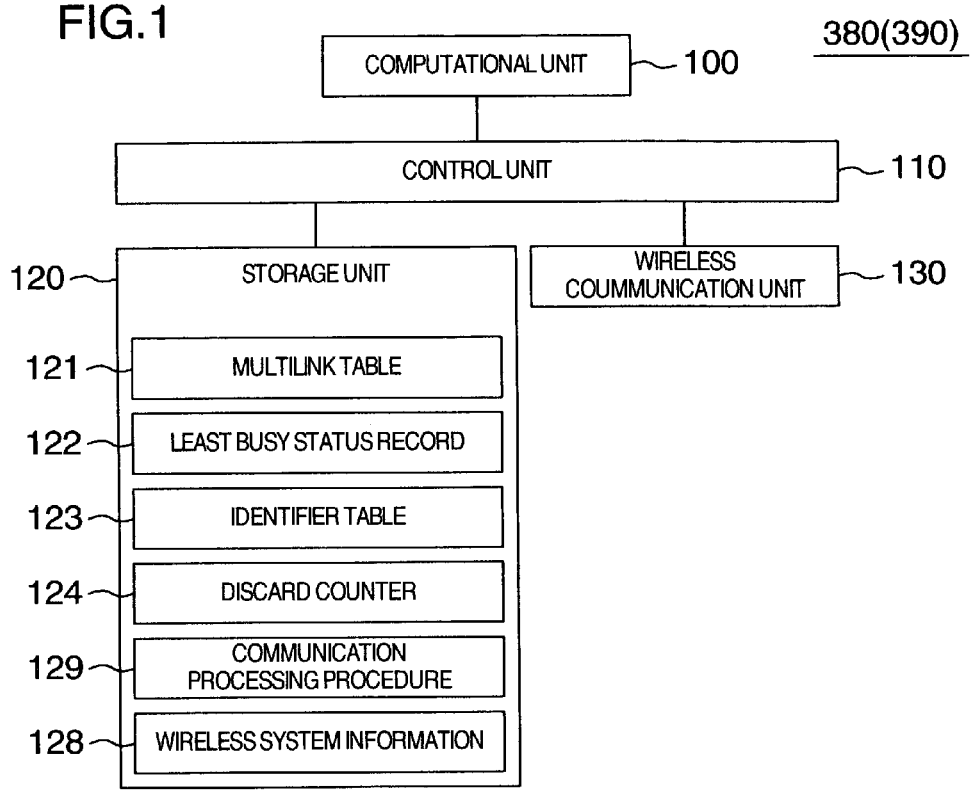
FIG. 1 is a block diagram showing a configuration of a wireless system terminal to which a wireless communication method according to an embodiment of the present invention is applied.

An embodiment of the present invention, that has been applied to a wireless LAN will be described in detail with reference to appended drawings. Hereinafter, a "busy state" is defined as a "state where a communication load is low".

The embodiment will be described in the following sections:

Section 1: Principle Underlying Solution of Problems

Section 2: Overview of a Multilink and an Example of System Configuration

Section 3: Least Busy Multilink Base Transceiver Station Selection Method

Section 4: An Example of Data Transmission From a Base Transceiver Station to a Wireless System Terminal Section 5: An Example of Data Transmission From a Wireless System Terminal to a Base Transceiver Station Hereinafter, "communication" along the multilink, in particular, is defined as "selecting one of base transceiver stations to which a wireless system terminal is connected and then performing communication with the selected base transceiver station". A "multilink base transceiver station" is hereinafter defined as a "base transceiver station to which the wireless system terminal is connected along the multilink". The number of multilink base transceiver stations may be one, or two or more. A "link reference value" is defined as a "reference value referenced when the wireless system terminal selects a multilink base transceiver station".

Section 1: Principle Underlying Solution of Problems §1-1. Stable Communication and Improvement in Throughput A wireless system terminal according to this embodiment determines a base transceiver station for connection according to the radio signal receiving sensitivity of the base transceiver station. In other words, if a radio receiving signal strength such as −70 dBm has been set to the link reference value for the wireless system terminal, the wireless system terminal checks base transceiver stations that are connectable at a current location and the receiving signal strengths of the respective base transceiver stations. Then, the wireless system terminal determines base transceiver stations having the receiving signal strength equal to or more than the link reference value as multilink base transceiver stations. If no base transceiver station having the receiving signal strength equal to or more than the current link reference value is present, the link reference value is set again to a lower value such as −80 dBm, for selection of the multilink base transceiver stations. Alternatively, an S/N ratio can also be employed as the link reference value.

In this embodiment, at a multilink base transceiver station with the radio signal supplied therefrom weakened due to a failure or the like or disconnected, connection to the wireless system terminal is automatically disconnected. Accordingly, the wireless system terminal loses an opportunity to communicate with the multilink base transceiver station with its radio signal weakened, so that stable communication is always ensured, and the error rate of data communication is reduced. Hence, the throughput of the wireless communication system is improved.

§1-2. Reduction in the Frequency of Roaming and Improvement in Throughput

In a conventional wireless communication system, whenever a wireless system terminal performs roaming, it is necessary to perform processing for cancelling an old link and establishing a new link on both sides of the wireless system terminal and base transceiver stations. In processing for controlling wireless LAN links, link control needs to be completed in conformity with protocols in one or two layers of the OSI reference model based on a proposal developed by the International Organization for Standardization. When a rash of roaming occurs, enormous computational resources are assigned to processing for the link control. Consequently, the throughput of the communication system is reduced.

In this embodiment, however, the wireless system terminal and all multilink base transceiver stations have already completed the link establishment processing when a multilink process is finished. Thus, as long as the wireless system terminal switches connection among the multilink base transceiver stations, there is no need to perform the link control processing again. Accordingly, the throughput of the communication system is improved. However, when the wireless system terminal has moved to a distant location and the receiving signal strengths of all the multilink base transceiver stations have been reduced, the wireless system terminal roams to another base transceiver station having a higher receiving signal strength, as necessary.

§1-3. Communication Load Balance and Improvement in Throughput

Hereinafter, "quasi-busy" is defined as a "busy rate ranked in an arbitrarily-set place".

When communication between the wireless system terminal and a multilink base transceiver station is performed, the wireless system terminal selects the least busy or quasi-least busy multilink base transceiver station among its multilink base transceiver stations. In this method, the busy rates of the base transceiver stations are compared, and communication can be newly assigned to a base transceiver station with a low communication load. Thus, a waiting period for data transmission and reception is reduced, so that the throughput of the communication system is improved.

Hereinafter, a description will be centered on a method of selecting the least busy multilink base transceiver station by a data transmission source.

Section 2: Overview of a Multilink and an Example of System Configuration

§2-1. Multilinking by Wireless System Terminal

In the wireless LAN, a specific channel or a radio frequency band is allocated to each of the base transceiver stations. On the other hand, a single wireless communication unit equipped with the wireless system terminal can perform communication over a single channel alone at an arbitrary moment. There are two methods for the wireless system terminal to simultaneously communicate with a plurality of base transceiver stations, under this condition: the first method is the method of performing time division channel switching for a single radio communication unit, and the second method is the method of equipping a plurality of radio communication units with the wireless system terminal. Hereinafter, a description is centered on the first method.

§2-2. An Example of Wireless System Terminal Configuration

FIG. 1 is a configuration of the wireless system terminal according to this embodiment. The wireless system terminal in this embodiment is constituted by an information processing apparatus, for example, and has the following configuration by way of an example.

A computational unit 100 is the unit such as a CPU, for performing processing required for communication. A control unit 110 controls data that flows between the computational unit 100, a storage unit 120, and a wireless communication unit 130. The control unit 110 may be an independent device, or included in the computational unit 100. The storage unit 120 is the unit such as an internal storage device including a semiconductor memory or an external storage device including an HDD, for storing processing procedures required for communication, information on a wireless communication system, information on multilink base transceiver stations, and so on. The HDD (Hard Disc Drive) is a storage device using a magnetic disk that is a content-retaining recording medium.

A multilink table 121 registers all multilink base transceiver stations linked to a wireless system terminal. A least busy status record 122 registers base transceiver stations that have recently transmitted data to the wireless system terminal. An identifier table 123 stores identifiers for data received by the wireless system terminal. A discard counter 124 stores discard status of buffered data that has become unnecessary. A communication processing procedure 129 is the processing procedure such as a communication program, for the wireless system terminal to perform wireless communication. Wireless system information 128 is information referenced for performing wireless communication (e.g. the link reference value and wireless LAN channel information). The wireless communication unit 130 is a wireless LAN card, for example, for performing wireless communication with a wireless communication device.

Values actually registered in the multilink table 121 or the least busy status record 122 are MAC addresses, IP addresses, or serial numbers for base transceiver stations. MAC (Media Access Control) addresses are identifiers for performing communication control in the second layer of the OSI reference model. IP (Internet Protocol) addresses are identifiers for performing communication control in the third layer of the OSI reference model.

§2-3. An Example of Base Transceiver Station Configuration

Hereinafter, "buffering" is defined as "temporarily storing data to be transmitted to a device connected to the wireless communication system".

Figure 2:
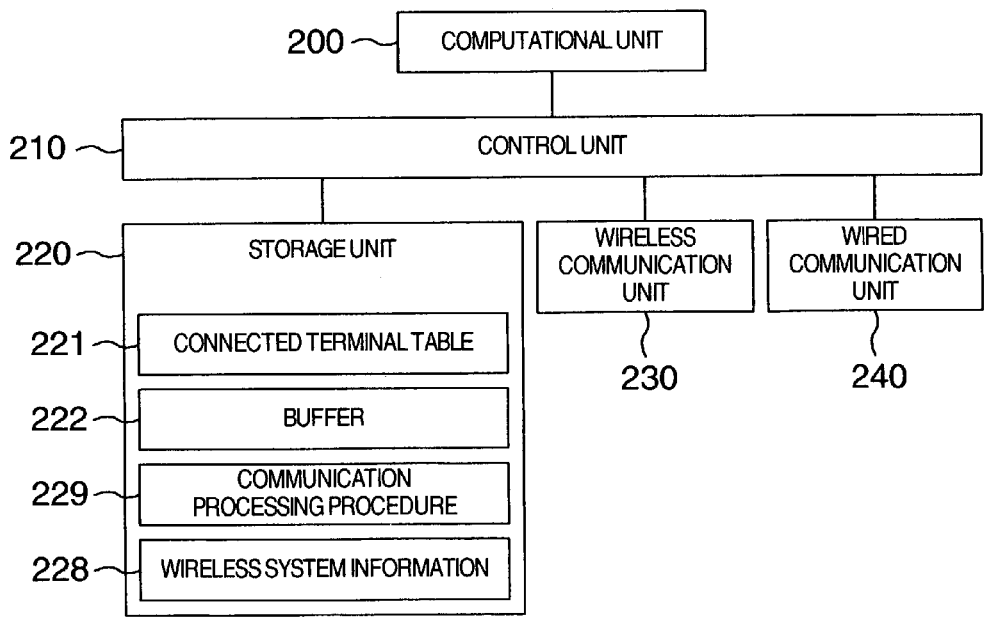
FIG. 2 is a block diagram showing a configuration of a base transceiver station to which the wireless communication method according to the embodiment of the present invention is applied.

FIG. 2 is a configuration of a base transceiver station according to this embodiment. A computational unit 200, a control unit 210, and a wireless communication unit 230 are identical to the computational unit 100, control unit 110, and wireless communication unit 130 in FIG. 1, respectively. Wireless system information 228 is identical to the wireless system information 128 in FIG. 1.

A storage unit 220 stores processing procedures required for communication, information on the wireless communication system, information on connected terminals, and so on and performs buffering. As the storage device 220, an internal storage device such as the semiconductor memory and an external storage device such as the HDD can be pointed out. A connected terminal table 221 registers wireless system terminals connected to the base transceiver station. A buffer 222 buffers communication data transmitted from and to the wireless system terminal. A communication processing procedure 229 is the processing procedure for the base transceiver station to perform wireless or wired communication with the wireless system terminal. A wired communication device 240 is the device for performing wired communication with a wired communication device. Values actually registered in the connected terminal table 221 are the MAC addresses, IP addresses, or serial numbers for the wireless system terminals.

§2-4. An example of System Configuration

Figure 3:
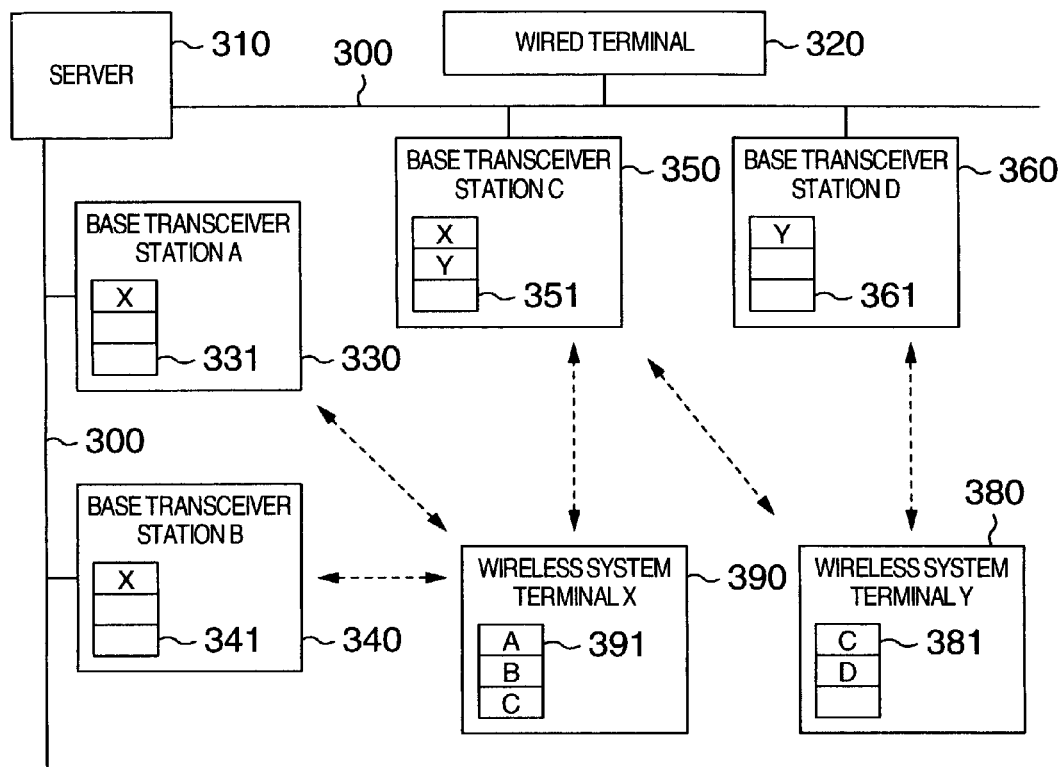
FIG. 3 is a conceptual diagram showing an overview of a multilink operation and a configuration of a wireless communication system to which the wireless communication method according to the embodiment of the present invention is applied.

FIG. 3 is a conceptual diagram showing a configuration of the wireless communication system and an overview of a multilink according to this embodiment.

In this embodiment, a server 310, a wired terminal 320, and a plurality of base transceiver stations 330(A), 340(B), 350(C), and 360(D) are connected to a wired network 300 using a LAN cable or the like. Connected terminal tables 331, 341, 351, and 361 for the base transceiver stations 330(A), 340(B), 350(C) and 360(D), respectively are identical to the connected terminal table 221 in FIG. 2.

In this embodiment, wireless system terminals 390(X) and 380(Y) are further disposed. Multilink tables 391 and 381 for the respective wireless system terminals are identical to the multilink table 121 in FIG. 1. Data on the base transceiver stations and the wireless system terminals connected in a manner as shown in FIG. 3 is stored in the respective connected terminal tables and the multilink tables for the wireless system terminals.

The wired network 300 is a wired LAN for fixedly interconnecting the base transceiver stations and an information processing device such as the wired terminal in the wireless LAN. Other examples include an FDDI (Fiber Distributed Data Interface) computer network and a telecommunication network such as a telephone line network. The FDDI is a standard for a high-speed computer network that uses an optical fiber. Other devices directly connected to the wired network 300 include devices having a wired network communication function, such as a printer and a hub. Hereinafter, the device directly connected to the wired network 300 is represented by the wired terminal 320.

Base transceiver stations 330, 340, 350, and 360 are access points in the wireless LAN, to which all base transceiver stations that relays between the wired network 300 and a wireless network or between wireless networks correspond. The wireless system terminals 390 and 380 are wireless LAN clients in the wireless LAN, to which any wireless system terminal that communicates with a device connected to the wireless communication system via a base transceiver station corresponds.

§2-5. An Example of Multilinking Process for Wireless System Terminal

An example of a multilinking process for the wireless system terminal in this embodiment will be described with reference to FIG. 3.

Referring to FIG. 3, it is assumed that for the wireless system terminal 390, the receiving signal strengths of the base transceiver stations 330, 340, and 350 are equal to or more than the link reference value, and the receiving signal strength of the base transceiver station 360 is less than the link reference value.

First Process: The wireless system terminal 390 searches all channels in the wireless LAN, and checks the receiving signal strengths of the base transceiver stations 330, 340, 350, and 360 that can be connected to the wireless system terminal 390 at a current location.

Second Process: The wireless system terminal 390 compares the receiving signal strengths of the wireless system terminals with the link reference value, respectively, and selects the base transceiver stations 330(A), 340(B), and 350(C) having the receiving signal strengths equal to or more than the link reference value.

Third Process: The wireless system terminal 390 registers the base transceiver stations 330(A), 340(B), and 350(C) having the receiving signal strengths equal to or more than the link reference value in the multilink table 391.

During the first to third processes, a "process of selecting only a base transceiver station having a network identifier identical to the one for the wireless system terminal as a candidate for connection" may also be performed. This process corresponds to "determination of candidates for connection by SSID" in the wireless LAN. The SSID (Service Set Identification) is a network identifier in the wireless LAN. The candidates for connection can also be determined based on coincidences of encryption keys used for data communication. Alternatively, a plurality of network identifiers or encryption keys may be stored for determination of the candidates for connection. The network identifiers and the encryption keys are stored in the wireless system information in the respective wireless system terminals.

Process After Determination of Multilink Base Transceiver Stations: If the receiving signal strength of one of the base transceiver stations 330, 340, and 350 for the wireless system terminal 390 has become less than the link reference value, the wireless system terminal 390 halts connection to the base transceiver station, and deletes the base transceiver station from the multilink table 391.

On the contrary, when a base transceiver station having a receiving signal strength for the wireless system terminal 390 equal to or more than the link reference value is newly added to FIG. 3, the wireless system terminal 390 is connected to this base transceiver station as well, and adds the base transceiver station to the multilink table 391. When the receiving signal strengths of the frequency bands of the base transceiver stations have changed as a result of movement of the wireless system terminal 390, connection is also halted or initiated.

As a method of executing the process after determination of the multilink base stations, there is provided the method where a wireless system terminal checks or scans all channels in the wireless LAN periodically, thereby checking the receiving signal strengths of the base transceiver stations.

When the receiving signal strengths of the base transceiver stations 350 and 360 for the wireless system terminal 380(Y) are equal to or more than the link reference value, and when the receiving signal strengths of the base transceiver stations 330 and 340 are less than the link reference value, the wireless system terminal 380 registers the base transceiver stations 350(C) and 360(D) in the multilink table 381.

§2-6. An Example of Multilinking Process for Base Transceiver Station

An example of the multilinking process for a base transceiver station will be described with reference to FIG. 3.

An operation corresponding to MAC address registration in a wireless system terminal connected to an access point in the wireless LAN is performed. The base transceiver stations 330, 340, 350, and 360 register all wireless system terminals connected to the respective base transceiver stations in their connected terminal tables 331, 341, 351, and 361, respectively.

The receiving signal strengths of the base transceiver stations 330, 340, 350, and 360 for the wireless system terminal 390 and multilink base transceiver stations for the wireless system terminal 390 in FIGS. 5 to 13 follow the overview of the multilink in FIG. 3.

Hereinafter, establishment of connection resulting from the multilinking process described in §2-5 and §2-6 Subsections is indicated by dotted lines with arrows between the wireless system terminals and the base transceiver stations.

Section 3: Method of Selecting Least Busy Multilink Base Transceiver Station

Hereinafter, "download" is defined as "data transmission from a base transceiver station to a wireless system terminal". "Upload" is defined as "data transmission from a wireless system terminal to a base transceiver station". A "control signal" is defined as the "control signal for performing communication control". "Data" is defined as "information to be transmitted or received".

One of the features of this embodiment is that when communication is performed between a wireless system terminal and a multilink base transceiver station, the least busy multilink base transceiver station with a minimum load is selected. Three types of selection methods will be outlined below.

§3-1. Busy Rate Checking Signal

One method of a type is applied to "download" or "upload" transmission; busy rate checking signals are transmitted to all multilink base transceiver stations. Then, the response times of the multilink base transceiver stations to the busy rate checking signals are compared. The multilink base transceiver station with the shortest response time is determined to be in the least busy state.

In another method of the type, buffered data amount information on a multilink base transceiver station is included in a signal transmitted from the multilink base transceiver station in response to a busy rate checking signal, thereby making determination as to the busy rate. The buffered data amount information in response signals from all the multilink base transceiver stations are compared. Then, the station that has transmitted the response signal having the smallest buffered data amount is determined to be in the least busy state.

A device for transmitting the busy rate checking signals and making determination as to the busy rate according to the above two methods is the device which collectively checks a wireless or wired data transmitting source terminal or the busy statuses of the multilink base transceiver stations.

Since the busy rate checking signal and the response signal consist of approximately several bytes, respectively, their influence on the communication load is small. Further, since the delay of the response signal is approximately several milliseconds, accurate busy rate checking can be performed.

Details of the above-described methods will be described in a §4-1 Subsection. These methods have the advantage in that a mechanism for implementing the methods is simple.

§3-2. Buffering at All Base Transceiver Stations

Another type method is applied to "download" transmission. In this method, data to a wireless system terminal is buffered at all multilink base transceiver stations for the terminal. The higher the multilink base transceiver station busy rate is, transmission of the data to the wireless system terminal is performed faster. In this method, however, a mechanism for avoiding duplicate data reception of the second and subsequent data transmissions becomes necessary. Details of this method will be described in a §4-2 Subsection. In this method, communication for checking the busy rates is not present. Thus, the communication load is small. Since there is little delay in data transmission to the wireless system terminal after the least busy multilink base transceiver station has been determined, data transmission based on the precise busy rate becomes possible. In a wired LAN network, when a switching mechanism is not present, all terminals within the network receive all data once and discard nonassociated data. Accordingly, the number of times transmission of data to the wireless system terminal is performed from a transmission source to all the multilink base transceiver stations is once.

§3-3. Least Busy Status Record

Another type method is applied to "upload" transmission. The wireless system terminal determines the multilink base transceiver station that has transmitted the most recent data to the wireless system terminal to be in the least busy state. The wireless system terminal receives data that has passed through the multilink base transceiver station in the least busy state at an arbitrary point of time. Accordingly, the transmission source of the data can be regarded as being in the least busy state. The type of the received data employed for determination as to the busy rate is the data individually transmitted to the wireless system terminal or broadcast data. Details of this method will be described in the Section 5. The advantage of this method is that since the communication for the busy rate checking is not present, the communication load is low.

Section 4: An Example of Data Transmission From a Base Transceiver Section to a Wireless System Terminal The method of performing download data transmission from a base transceiver station to a wireless system terminal according to this embodiment is broadly categorized into two types: the first method is the method of using the "busy rate checking signal" described in the §3-1 Subsection, while the second method is the method of using "buffering at all base transceiver stations" in the §3-2 Subsection. Details of these methods will be described below.

§4-1. Use of Busy Rate Checking Signal

Hereinafter, a "base transceiver station monitoring device" is defined as the "device for ranking the busy rates of the base transceiver stations". The base transceiver station monitoring device in this section is the server 310. Monitoring of the base transceiver stations by the base transceiver station monitoring device may be performed on a segment basis of the network. A segment is the unit that constitutes the network.

Figure 4:
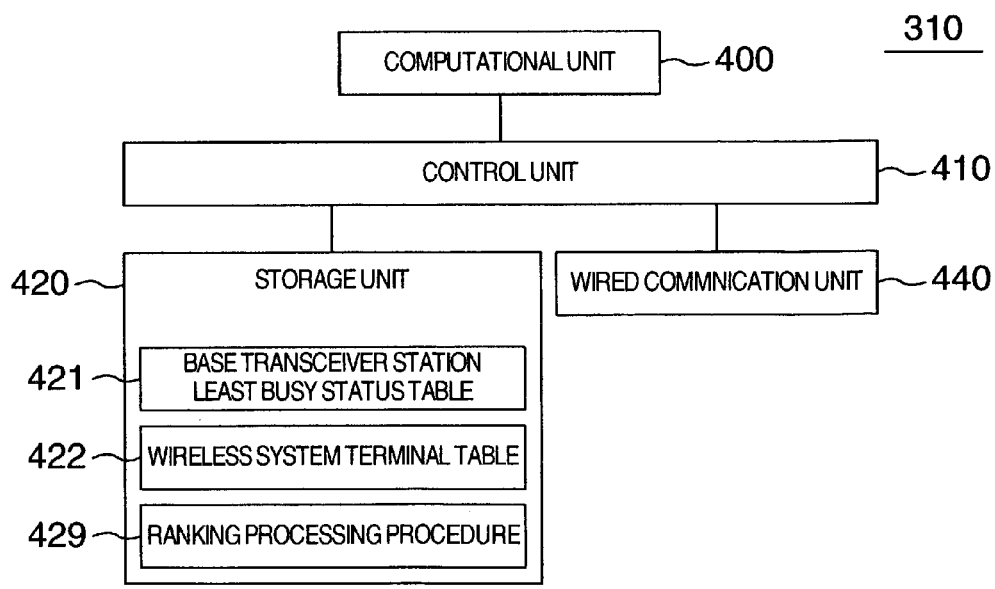
FIG. 4 is a block diagram showing a configuration of a base transceiver station monitoring device in the wireless communication system to which the wireless communication method according to the embodiment of the present invention is applied.

§4-1-1. An Example of Configuration of Base Transceiver Station Monitoring Device FIG. 4 shows a configuration of the server 310 described in a §4-1 Subsection. A computational unit 400 is the unit such as the CPU, for performing processing for ranking the busy rates of the base transceiver stations. A control unit 410 and a wired communication unit 440 are identical to the control unit 210 and the wired communication unit 240 in FIG. 2, respectively. A storage unit 420 is the unit for storing a processing procedure for ranking the busy rates of the base transceiver stations or information required for ranking the busy rates. As the storage device 420, an internal storage device such as the semiconductor memory or an external storage device such as the HDD can be pointed out. A base transceiver station busy status table 421 stores the ranking order of the busy rates of the base transceiver stations. A wireless system terminal table 422 stores correspondences between all the wireless system terminals and multilink base transceiver stations. A ranking processing procedure 429 is the processing procedure for the base transceiver station monitoring device to rank the busy rates of the base transceiver stations.

§4-1-2. Data Communication Using Busy Rate Checking Signal

Figure 5:
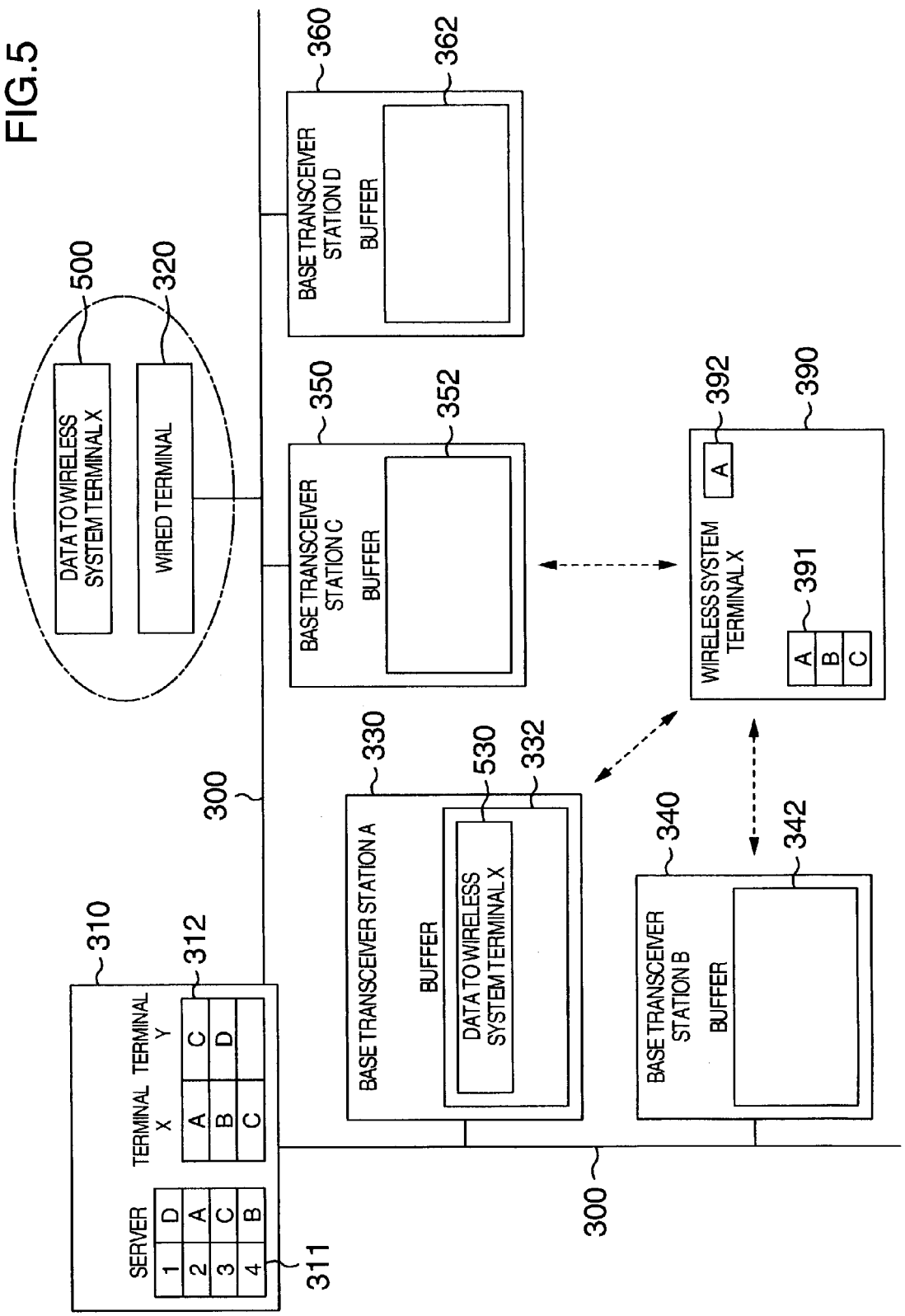
FIG. 5 is a conceptual diagram showing an example of data communication that uses a busy rate checking signal according to the wireless communication method in the embodiment of the present invention.
Figure 6:
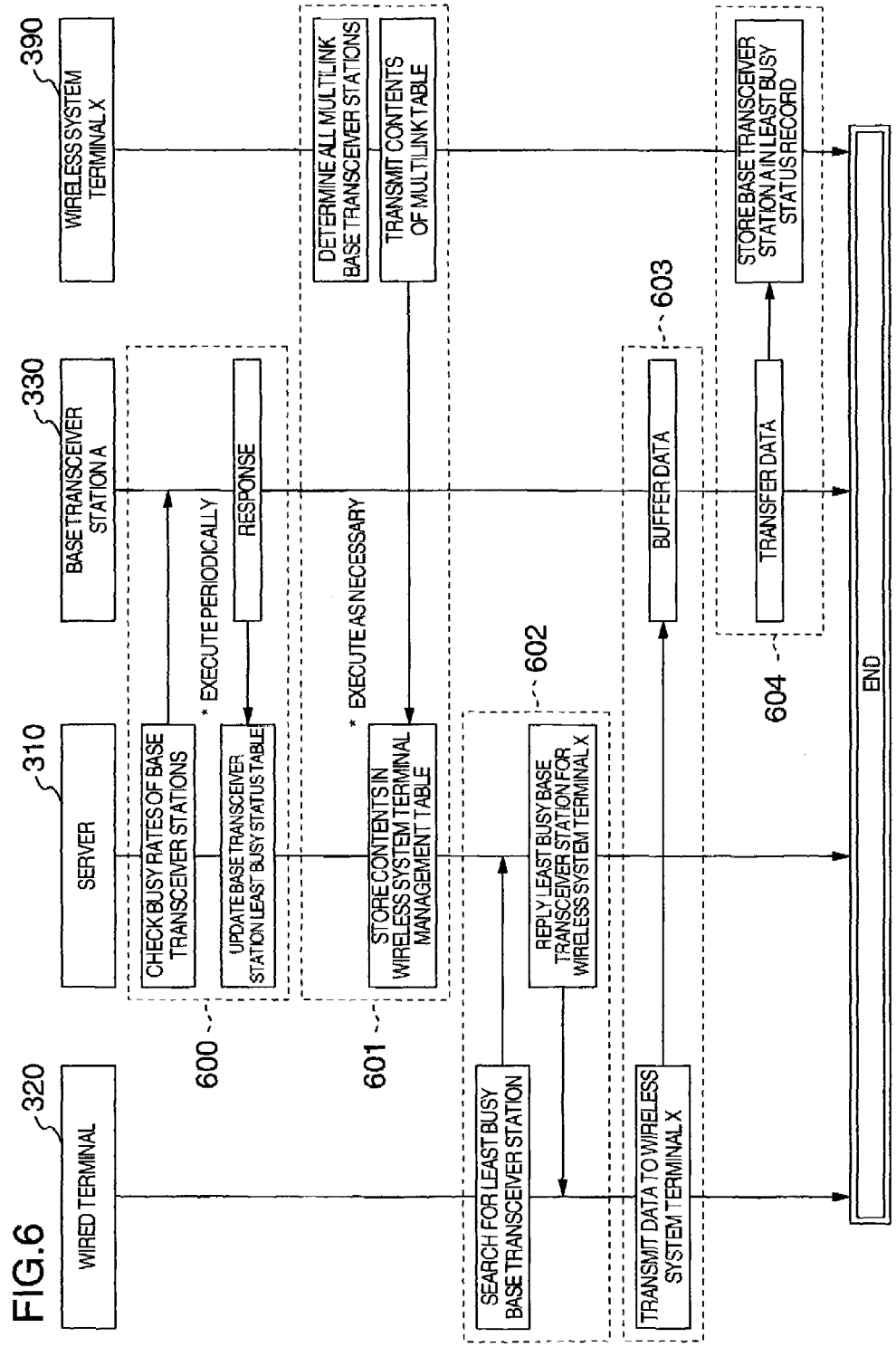
FIG. 6 is a flowchart showing a processing procedure for the data communication that uses the busy rate checking signal according to the wireless communication method in the embodiment of the present invention.
Figure 7:
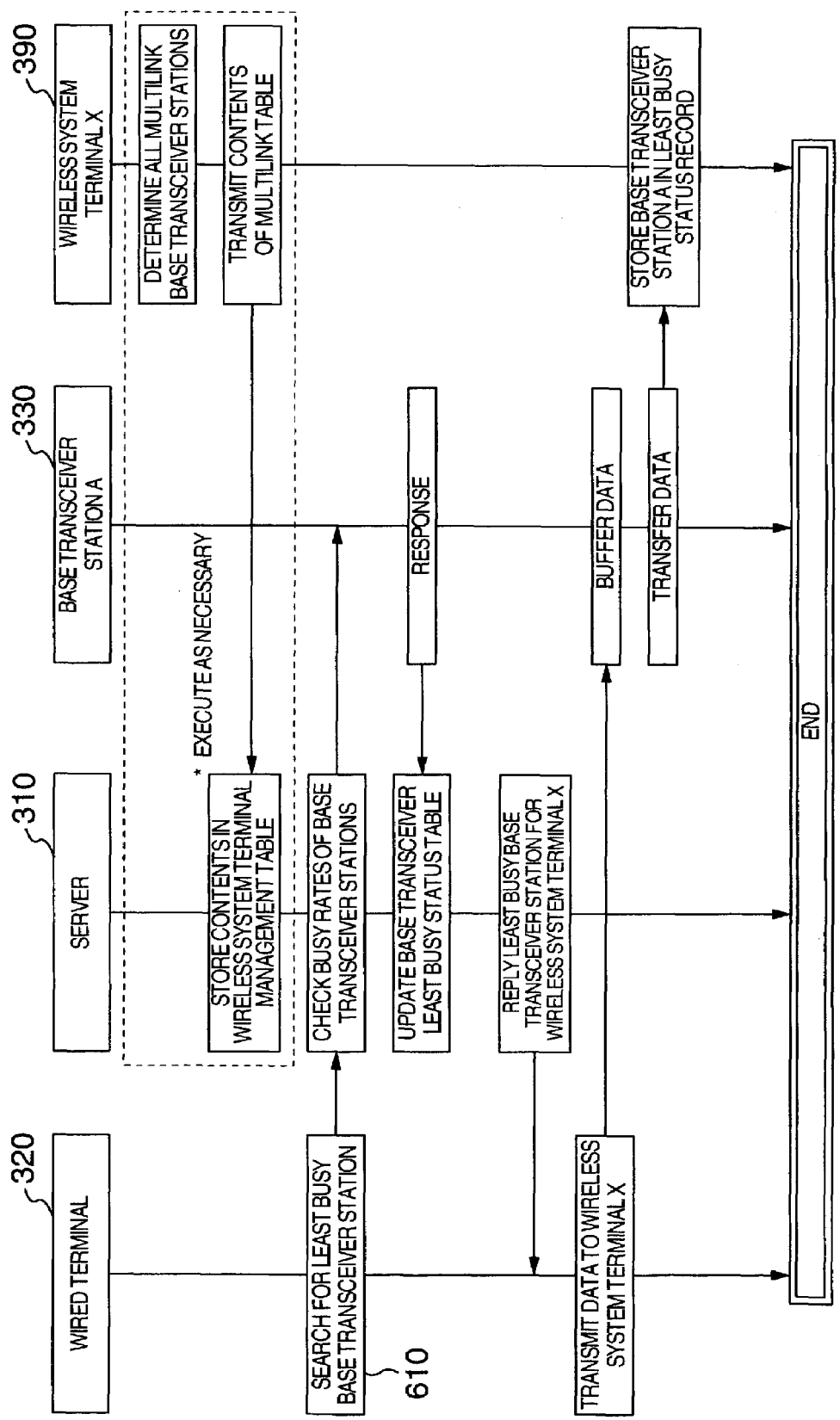
FIG. 7 is a flowchart showing a processing procedure for data communication that uses the busy rate checking signal according to the wireless communication method in the embodiment of the present invention.
Figure 8:
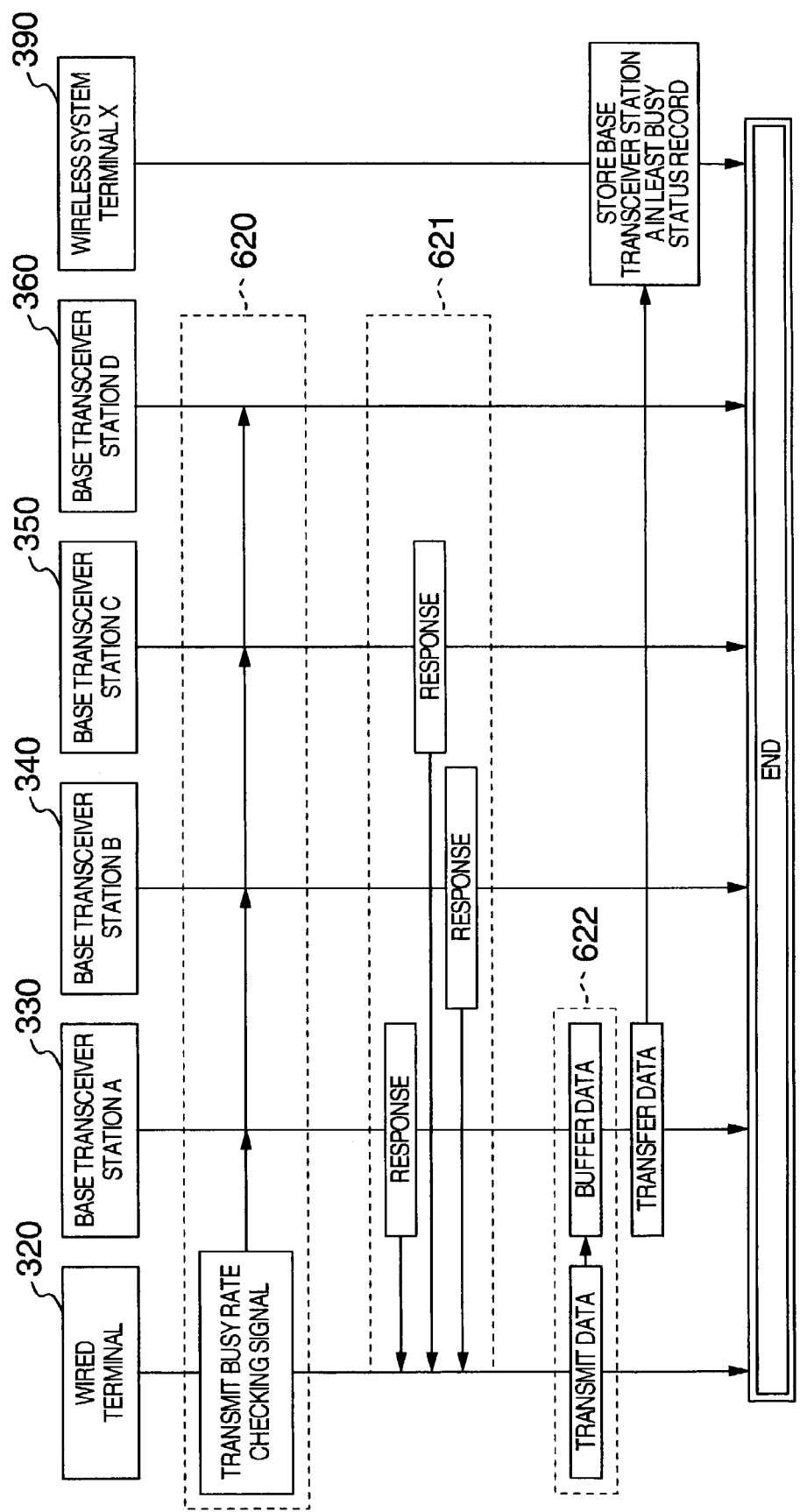
FIG. 8 is a flowchart showing a processing procedure for data communication that uses the busy rate checking signal according to the wireless communication method in the embodiment of the present invention.

FIG. 5 shows an example of data communication using the busy rate checking signal. FIGS. 6, 7, and 8 respectively show a processing procedure and data flows of data communication using the busy rate checking signal. Data transmission from the wired terminal 320 to the wireless system terminal 390 using the busy rate checking signal will be described with reference to FIGS. 5 and 6.

A base transceiver station busy least status table 311 and a wireless system terminal table 312 of the server 310 are identical to the base transceiver station busy status table 421 and the wireless system terminal table 422 in FIG. 4. Buffers 332, 342, 352, and 362 of respective wireless system terminals are identical to the buffer 222 in FIG. 2. A least busy status record 392 of the wireless system terminal 390 is identical to the least busy status record 122 in FIG. 1.

Next, the processing procedure and the data flows of the data transmission using the busy rate checking signal will be described with reference to FIG. 6.

First Process (Step 600): The server 310 periodically transmits the busy rate checking signals to the base transceiver stations 330, 340, 350, and 360 in order to rank the busy rates of all the base transceiver stations, and then determines the ranking order of the busy rates based on the response signals of the base transceiver stations to the busy rate checking signals. After the ranking order of the busy rates has been determined, the order is stored in the base transceiver station least busy status table 311.

Second Process (Step 601): At the moment when all the multilink base transceiver stations have been determined, the wireless system terminal 390 transmits the contents of the multilink table 391 to the server 310. The server 310 stores the received contents in the wireless system terminal table 312. Whenever the multilink table 391 has been updated, the wireless system terminal 390 transmits the contents of the multilink table 391 to the server 310.

Third Process (Step 602): Hereinafter, the base transceiver stations 330, 340, and 350 registered in the multilink table 391 are described as the multilink base transceiver stations. It is assumed in FIGS. 5 and 6 that the base transceiver station 360 is the least busy and the multilink base transceiver station 330 is the second least busy. The wired terminal 320 notifies the server 310 of the destination of "data to the wireless system terminal 390" 500. The server 310 refers to the base transceiver station least busy status table 311 and the wireless system terminal table 312, and confirms that the least busy multilink base transceiver station is the base transceiver station 330 for the wireless system terminal 390. After the confirmation, the server 310 reports it to the wired terminal 320. If it has been set in the wireless communication system that "data transmission from a wired terminal to three base transceiver stations with the top three ranking least busy rates is performed", "random selection from among the stations with the top three ranking least busy rates using random numbers" or "data transmitting priorization by regularly changing the numbers of the order" may be performed before reporting. Hereinafter, a connecting state between the wireless system terminal 390 and the least busy multilink base transceiver station is indicated by a thick dotted line with arrows. Hereinafter, "round" is defined as "time-division wireless LAN channel switching by a wireless system terminal to achieve successive switching of communication destinations among the multilink base transceiver stations".

Fourth Process (Step 603): The wired terminal 320 transmits the "data to the wireless system terminal 390" 500 to the least busy base transceiver station 330. The multilink base transceiver station 330 stores the received data in the buffer 332 as buffered data 530. An example of a data transmission procedure between a multilink base transceiver station and a wireless system terminal according to this embodiment will be described. In this embodiment, the wireless system terminal is connected to a plurality of multilink base transceiver stations. When a single wireless communication device is equipped with the wireless system terminal, it is necessary to switch the frequency of the wireless communication device to the frequency allocated to a target multilink base transceiver station for data transmission and reception.

Figure 14:
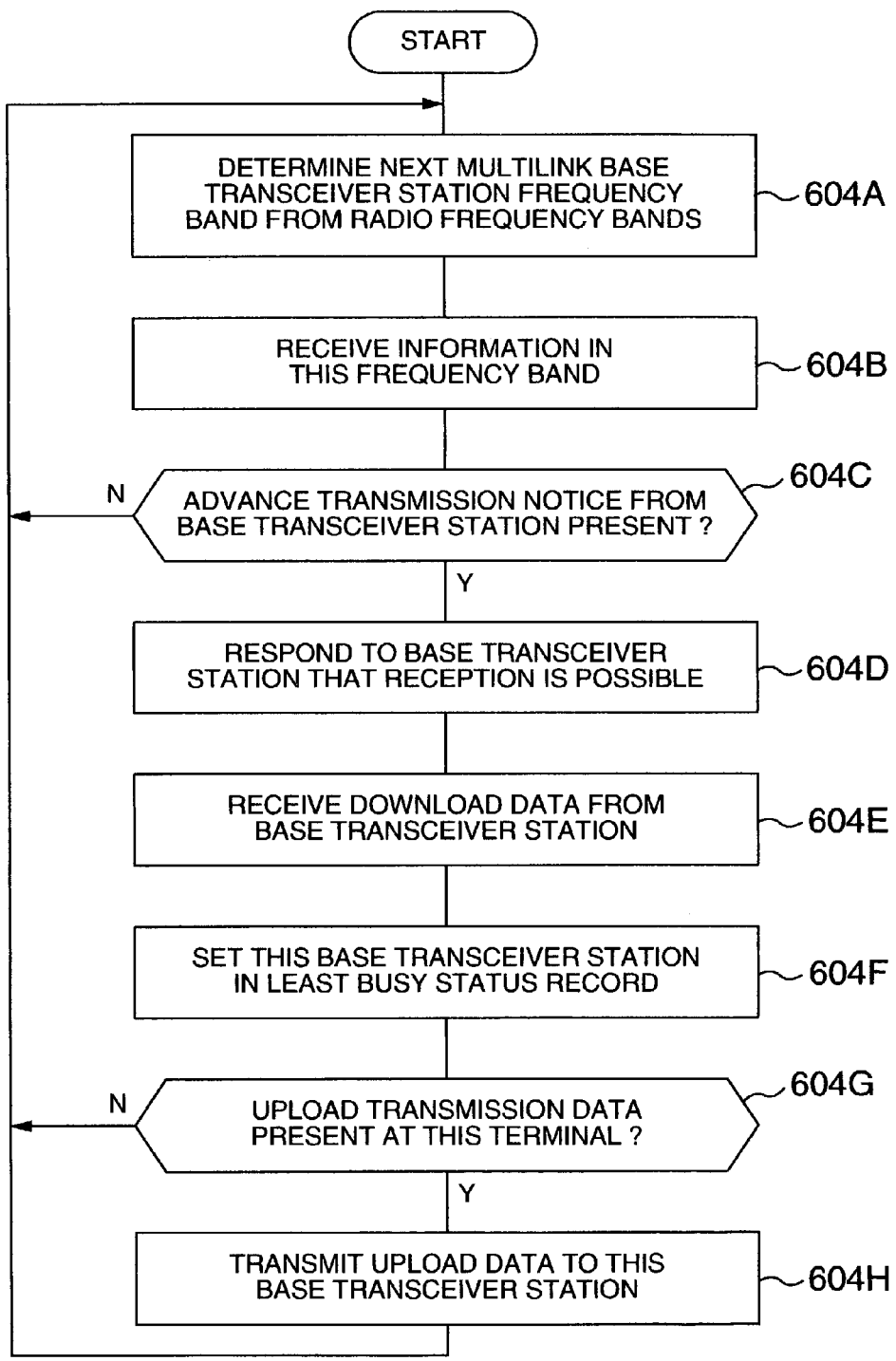
FIG. 14 is a flowchart showing an operation of the wireless system terminal during data communication according to the wireless communication method in the embodiment of the present invention.

As illustrated in a flowchart in FIG. 14, while making the round of the multilink base transceiver stations for switching the frequency band of the wireless communication device to the allocated frequency band of each of the multilink base transceiver stations one after another in step 604A, the wireless system terminal 390 tries to receive the advance notice of transmission from a certain multilink base transceiver station in step 604B. If reception of the advance notice of transmission from the multilink base transceiver station to the wireless system terminal 390 has been detected in step 604C, locking to the frequency of the multilink base transceiver station (the base transceiver station 330(A) in the case of FIG. 6) is performed to give to the multilink base transceiver station a response indicating that reception is possible, in step 604D. Then, the wireless system terminal 390 receives download data from the multilink base transceiver station in step 604E, and also registers the multilink base transceiver station 330(A) in the least busy status record 392 as the least busy base transceiver station in step 604F. Further, if it has been found in step 604G that upload transmission data is present in the wireless system terminal 390, the wireless system terminal 390 transmits the data to the target multilink base transceiver station in step 604H, and then returns to the step of making the round.

Figure 15:
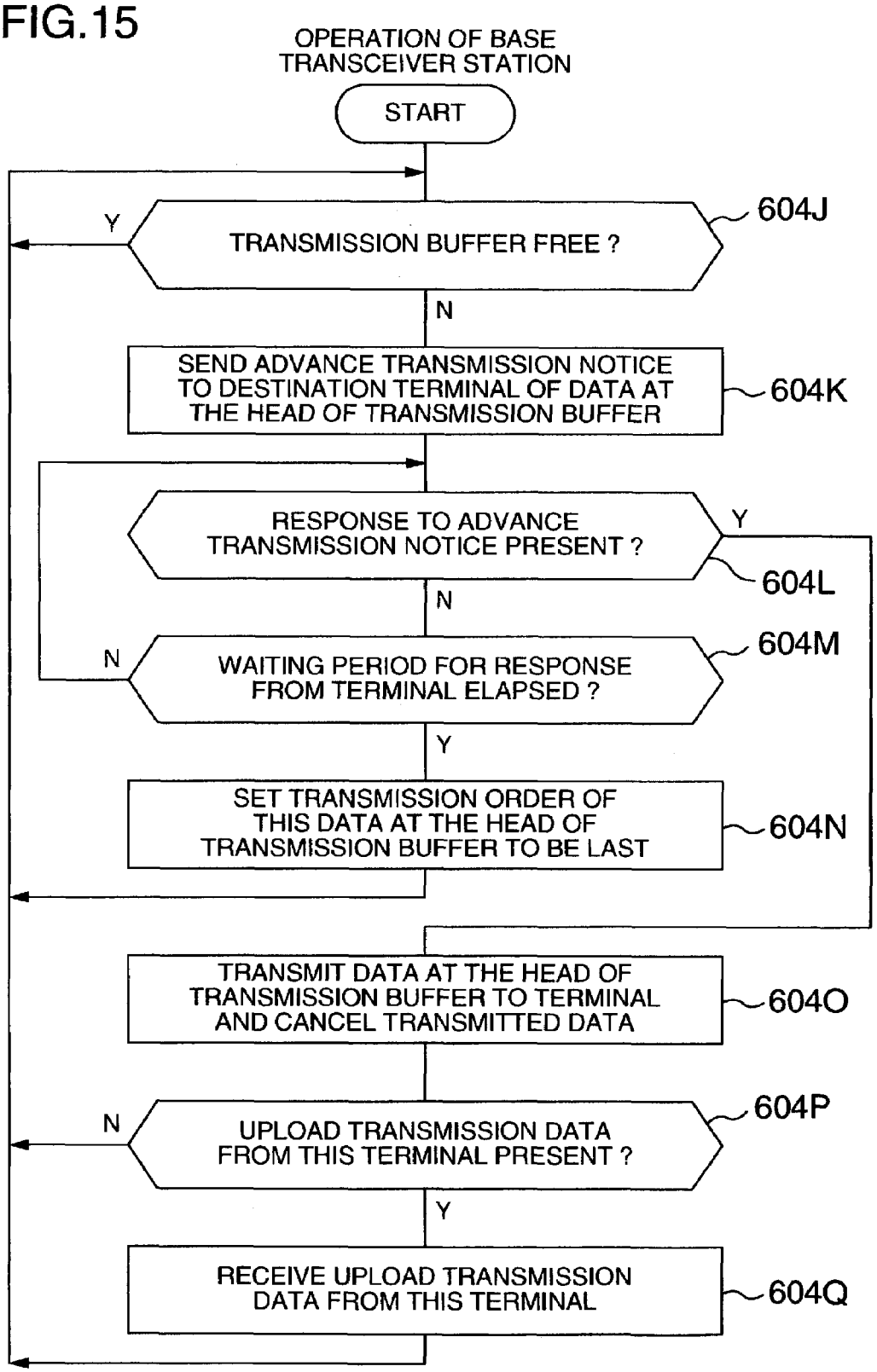
FIG. 15 is a flowchart showing an operation of the base transceiver station during the data communication according to the wireless communication method in the embodiment of the present invention.

An operation of a multilink base transceiver station associated with the flowchart in FIG. 14 is illustrated in a flowchart in FIG. 15. The multilink base transceiver station always monitors whether a transmission buffer where download transmission data to the wireless system terminal is stored is free or not, in step 604J. If the transmission data is present, the multilink base transceiver station selects the data at the head of the transmission order and send a transmission advance notice signal including information on identification of a destination terminal, in step 604K. Then, the multilink base transceiver station waits for a response from the wireless system terminal for a period of time corresponding to each round, using a timer in steps 604L and 604M. If it has been found in step 604L that there is no response indicating that reception is possible from the target wireless system terminal within this waiting period, the multilink base transceiver station sets the transmission order of the data at the head of the transmission buffer to be the last, and then repeats the procedure from step 604J to step 604N.

On the other hand, if it has been found in step 604L that there is the response from the target wireless system terminal, indicating that reception is possible, within the waiting period, the data at the head of the transmission buffer is transmitted to the target wireless system terminal, and the data thus transmitted is deleted from the transmission buffer in step 604O. Further, the presence or absence of upload data transmitted from the wireless system terminal is checked in step 604P. If it has been found that there is no transmission data, the procedure is returned to step 604J. If it has been found that the transmission data is present, the multilink base transceiver station receives the data in step 604Q. By using the transmission advance notice signal in this way, prompt, reliable, and efficient data transmission and reception become possible between one of the multilink base transceiver stations and a wireless system terminal that makes the round of the multilink base transceiver stations.

Fifth Process (step 604): The multilink base transceiver station 330 transmits the buffered data 530 to the wireless system terminal 390. The wireless system terminal 390 stores in the least busy status record 392 a record indicating that the multilink base transceiver station 330, which was a transmission source, was the least busy.

An example of the busy rate checking signal that changes a timing of the busy rate checking will be described with reference to FIG. 7. Referring to FIG. 6, the server 310 periodically performs the busy rate checking. On contrast therewith, referring to FIG. 7, the server 310 performs the busy rate checking after reception of a search for the least busy base transceiver station 610.

An example of the busy rate checking signal that is not sent by the server 310 will be described with reference to FIG. 8. The wired terminal 320 transmits to the multilink base transceiver stations 330, 340, 350, and the base transceiver station 360 the busy rate checking signal that includes information on the destination of the data, in step 620. The multilink base transceiver stations 330, 340, 350 and the base transceiver station 360 search their connected terminal tables 331, 341, 351, and 361, respectively. Whenever a hit is found in the connected terminal table of one of the base transceiver stations about the wireless system terminal that is the destination designated in the busy rate checking signal, that base transceiver station gives a response signal to the wired terminal 320, in step 621. The wired terminal 320 determines the multilink base transceiver station 330 to be in the least busy state according to the response signal received, in step 622.

§4-2. Data Communication Using Buffering at All Base Transceiver Stations

Hereinafter, a "data identifier" is defined as "a value of a time stamp or the like included in data that flows through the wireless communication system". It was already mentioned that for buffering at all base transceiver stations, the mechanism for avoiding duplicate reception at a wireless system terminal is necessary. Now, three avoidance methods will be outlined below.

(1) Commands to Dicard Unnecessary Data at Transferring Base Transceiver Stations A multilink base transceiver station that has transmitted data to a wireless system terminal fastest issues commands to discard buffered data to the remainder of the multilink base transceiver stations. The advantage of this method is that since the discard commands can be transmitted using wires, extra communication loads are not imposed on frequency bands for wireless communication. Wireless transmission of the discard commands may also be performed, alternatively. Still alternatively, it may also be so arranged that after the wireless system terminal has received buffered data from the least busy multilink base transceiver station, the wireless system terminal transmit the discard commands to the remainder of the multilink base transceiver stations. Details of this method will be described in a §4-2-1 Subsection.

(2) Discarding of Unnecessary Data Using the Data Identifier

In most cases, a unique identifier such as the time stamp accompanies data that flows within a network. A wireless system terminal stores identifiers for received data in its identifier table. Whenever the wireless system terminal receives data from a multilink base transceiver station, the wireless system terminal refers to the identifier table. The buffered data transmitted from the least busy multilink base transceiver station is received at the wireless system terminal, so that the identifier for the data is stored in the identifier table. Identifiers for the buffered data transmitted from the remainder of the multilink base transceiver stations are found to be identical to the identifier for the buffered data from the least busy multilink base transceiver station as a result of reference to the identifier table, so that those data is not received at the wireless system terminal. A data identifier inherent in each of wireless communication systems, for example, may also be employed as the data identifier. The advantage of this method is that duplicate reception can be avoided. Details of this method will be described in a §4-2-2 Subsection.

(3) Compound Discarding of Unnecessary Data

There is provided a method of simultaneously using the "commands to discard unnecessary data at transferring base transceiver stations" and the "discarding of unnecessary data using data identifier". The advantage of this method is that extra communication load might not be imposed on the frequency bands for wireless communication, and the duplicate reception can be avoided with reliability. Details of this method will be described in a §4-2-3 Subsection.

Figure 9:
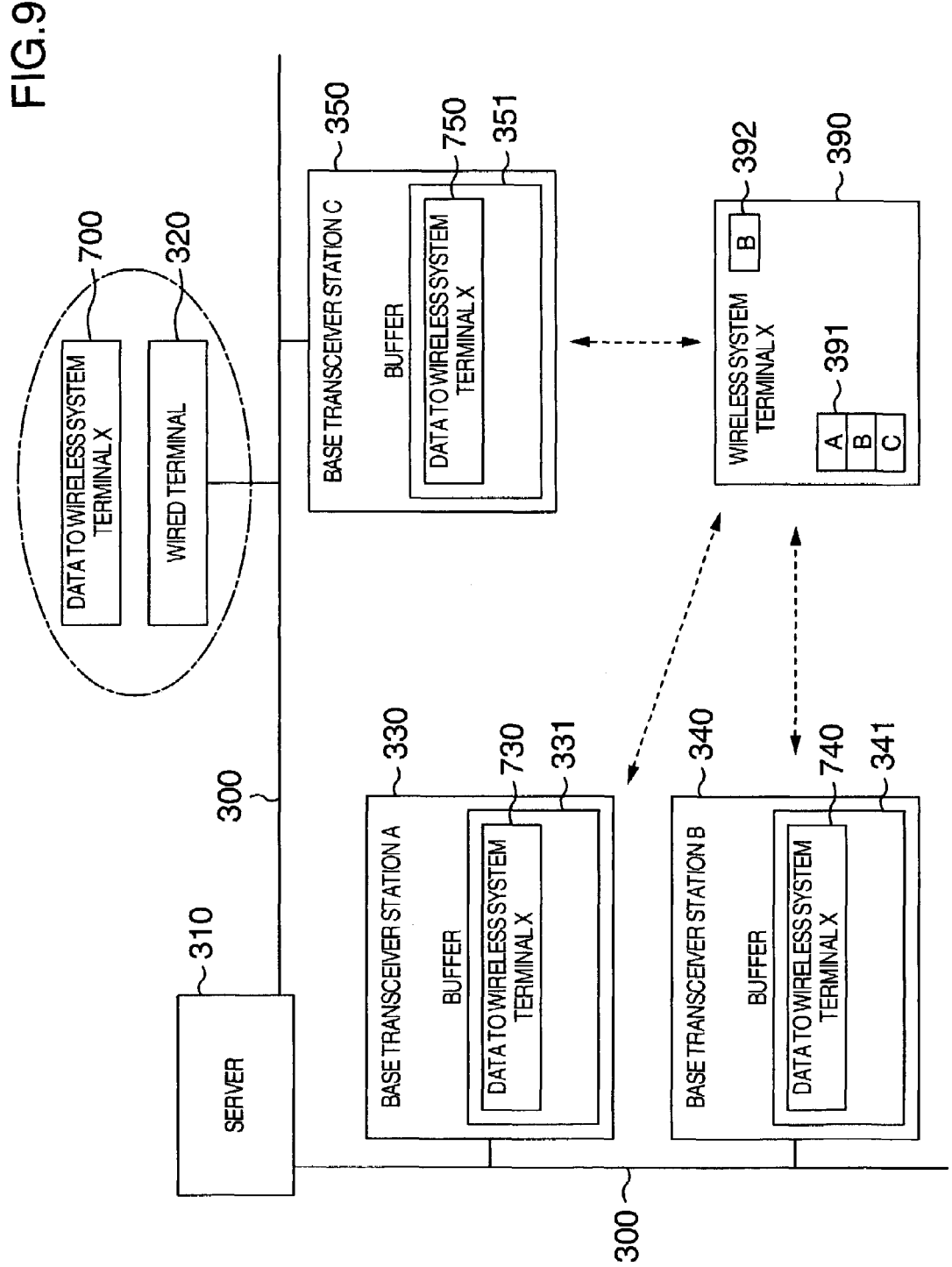
FIG. 9 is a conceptual diagram showing commands to discard unnecessary data at transferring base transceiver stations according to the wireless communication method in the embodiment of the present invention.
Figure 10:
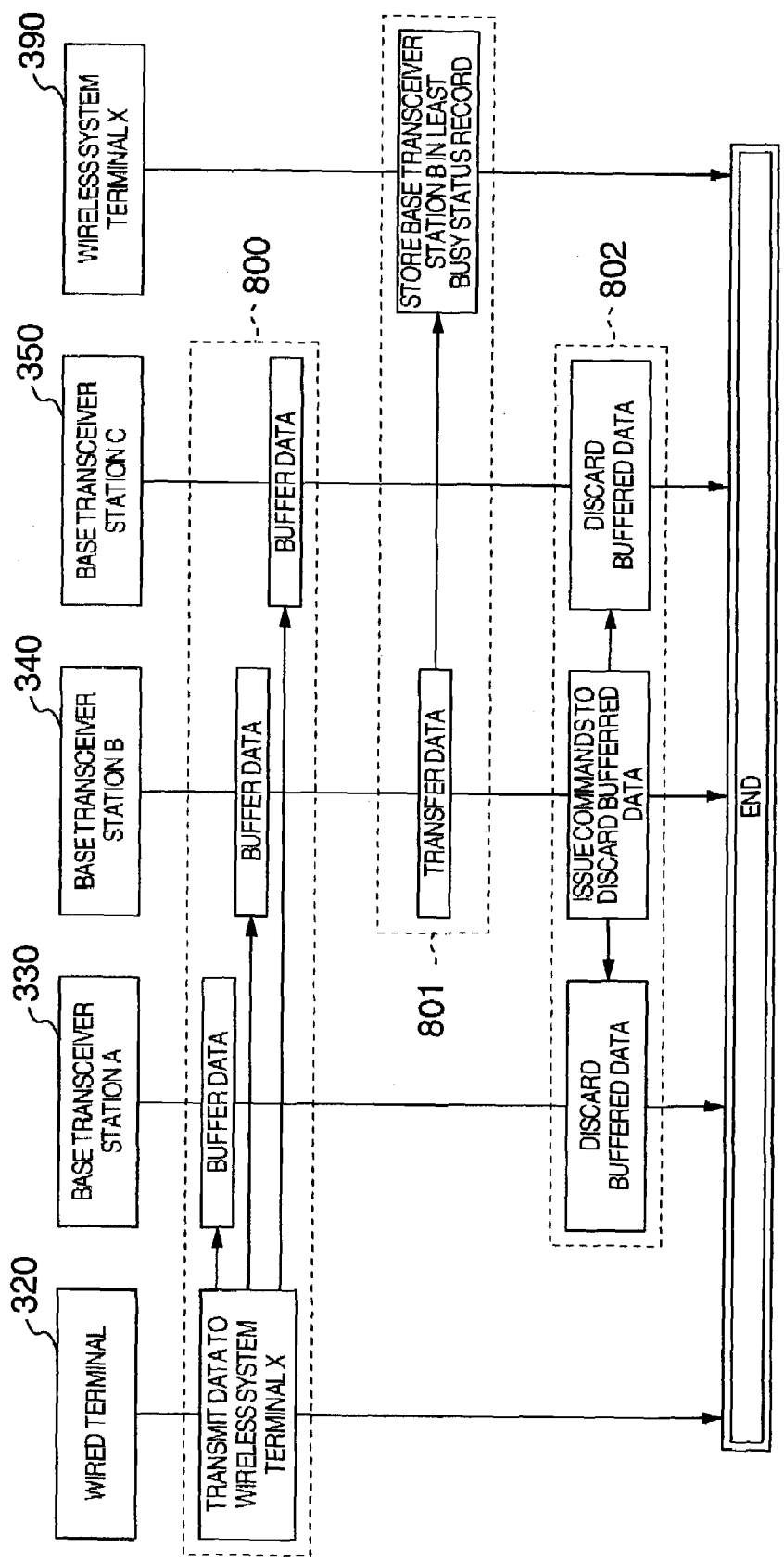
FIG. 10 is a flowchart showing a processing procedure for the commands to discard unnecessary data at the transferring base transceiver stations according to the wireless communication method in the embodiment of the present invention.

§4-2-1. Commands to Discard Unnecessary Data at Transferring Base Transceiver Stations FIG. 9 shows an example of commands to discard unnecessary data at transferring base transceiver stations. FIG. 10 shows a processing procedure for the commands to discard unnecessary data at the transferring base transceiver stations. Data transmission by the wired terminal 320 to the wireless system terminal 390 using buffering at all base transceiver stations and the commands to discard the unnecessary data at the transferring base transceiver stations will be described with reference to FIGS. 9 and 10.

First Process (Step 800): The wired terminal 320 transmits "data to the wireless system terminal 390(X)" 700 to the multilink base transceiver stations 330, 340, and 350 for the wireless system terminal 390. The multilink base transceiver stations 330, 340, and 350 stores the received data in their buffers 332, 342, and 352 as buffered data 730, 740, and 750, respectively.

Second Process (step 801): Referring to FIGS. 9 and 10, the multilink base transceiver station 340 is assumed to be in the least busy. While making the round of the base transceiver stations 330, 340, and 350 at arbitrarily-set time intervals, the wireless system terminal 390 receives the buffered data 740 from the least busy multilink base transceiver station 340. The wireless system terminal 390 also stores a record indicating that the multilink base transceiver station 340 was the least busy in the least busy status record 392. The time intervals for making the round by the wireless system terminal are set to be regular or random. The wireless system terminal makes the round of the multilink base transceiver stations in the order in which they are registered in the multilink table of the terminal, or at random.

Third Process (Step 802): The least busy multilink base transceiver station 340 that has transmitted the buffered data to the wireless system terminal 390(X) fastest issues the commands to discard the buffered data 730 and 750 to the base transceiver stations 330 and 350, respectively. The base transceiver stations 330 and 350, which have received the discard commands, discard the buffered data 730 and 750, respectively.

§4-2-2. Discarding of Unnecessary Data Using the Data Identifier

Figure 11:
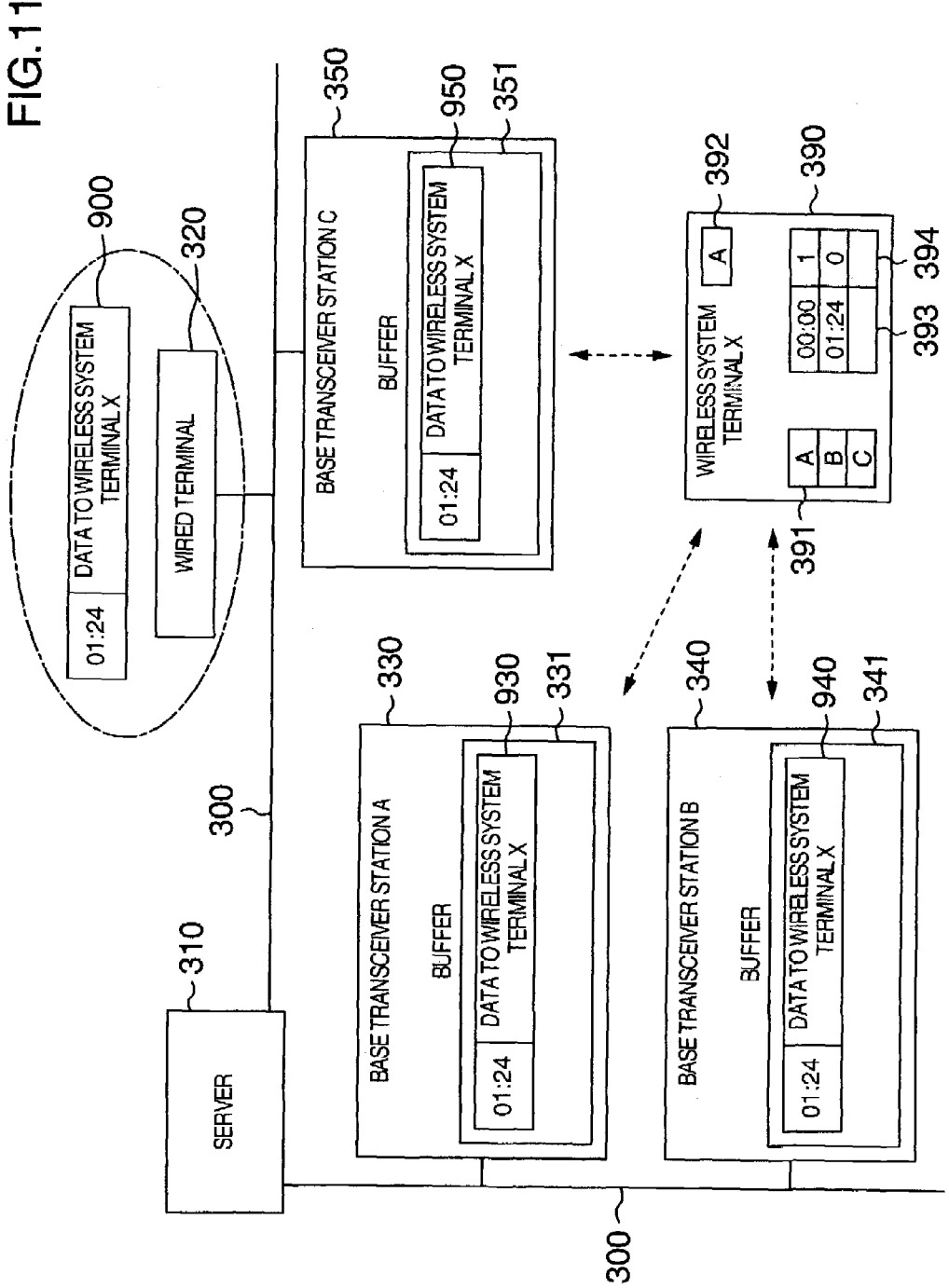
FIG. 11 is a conceptual diagram showing an example of discarding of unnecessary data using the data identifier according to the wireless communication method in the embodiment of the present invention.
Figure 12:
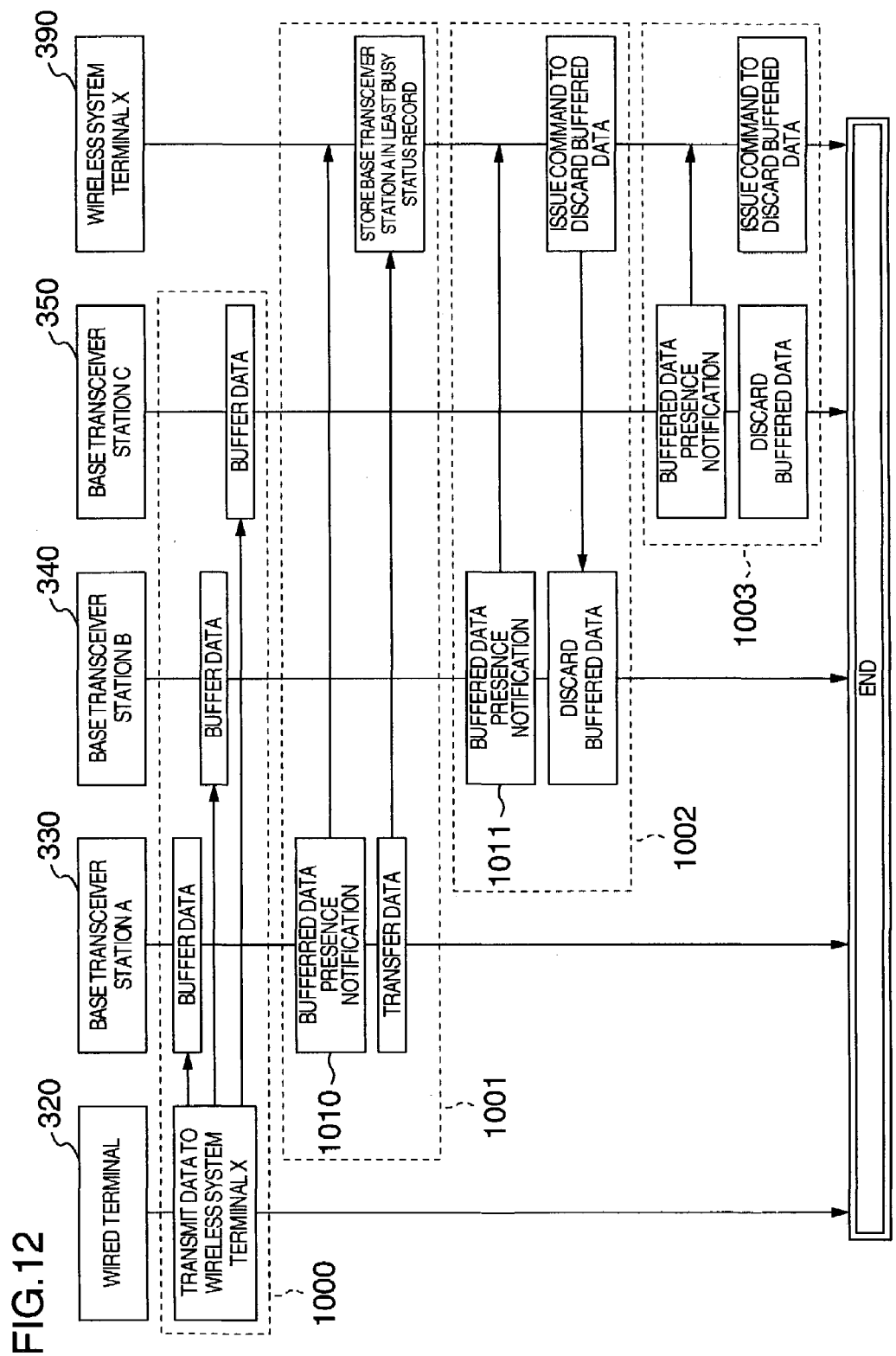
FIG. 12 is a flowchart showing a processing procedure for the discarding of unnecessary data using the data identifier according to the wireless communication method in the embodiment of the present invention.

FIG. 11 shows an example of discarding of unnecessary data using the data identifier. FIG. 12 shows a processing procedure for the discarding of unnecessary data using the data identifier. An identifier table 393 and a discard counter 394 of the wireless system terminal 390 are identical to the identifier table 123 and the discard counter 124 in FIG. 1. Data transmission to the wireless system terminal 390 by the wired terminal 320 using buffering at all base transceiver stations and the discarding of unnecessary data using the data identifier will be described with reference to FIGS. 11 and 12.

First Process (Step 1000): The wired terminal 320 transmits "data to the wireless system terminal 390(X)" 900 to the multilink base transceiver stations 330, 340, and 350 for the wireless system terminal 390.

Second Process (Step 1001): Referring to FIGS. 11 and 12, the base transceiver station 330 is assumed to be the least busy, and the base transceiver station 340 is assumed to be the second least busy. While making the round of the multilink base transceiver stations 330, 340, and 350, the wireless system terminal 390 receives a buffered data presence notification 1010 from the least busy multilink base transceiver station 330. In the buffered data presence notification 1010, the data identifier of buffered data 930 is included. The wireless system terminal 390 searches the identifier table 393 and confirms that the data identifier of the buffered data 930 is not registered in the identifier table 393 yet. The identifier table 393 is searched in the order starting from the most recent identifier and proceeding to successively older identifiers, or vice versa. After the confirmation, the wireless system terminal 390 receives the buffered data 930 from the base transceiver station 330(A) and registers the data identifier in the identifier table 393. The wireless system terminal 390 also stores a record indicating that the base transceiver station 330(A) was the least busy in the least busy status record 392.

Third Process (Step 1002): While making the round of the multilink base transceiver stations 330, 340, and 350, the wireless system terminal 390 receives a buffered data presence notification 1011 from the base transceiver station 340 that is the second least busy. The data identifier of buffered data 940 is included in the buffered data presence notification 1011. The wireless system terminal 390 searches the identifier table 393 to find the identifier that is identical to the data identifier of the buffered data 940. After finding the data identifier, the wireless system terminal 390 issues a command to discard the buffered data 940 to the base transceiver station 340. The base transceiver station 340, which has received the discard command, discards the buffered data 940. The identifier table 393 includes the discard counter 394, and increments the discard counter whenever the wireless system terminal issues the discard command to a multilink base transceiver station.

Fourth Process (Step 1003): After confirming that all unnecessary buffered data has been discarded or when the value of the discard counter has become the value obtained by subtracting one from the number of all the multilink base transceiver stations, the identifiers of the discarded data are deleted from the identifier table 393. The reason why the buffered data presence notification is issued is that transmission of a notification signal consisting of a small amount of data (i.e. several bytes) in advance can utilize the frequency bands for wireless transmission more efficiently than abrupt transmission of buffered data consisting of a large amount of data (several mega bytes in some cases) for discarding. The buffered data presence notification, however, may be omitted.

§4-2-3. Compound Discarding of Unnecessary Data

Figure 13:
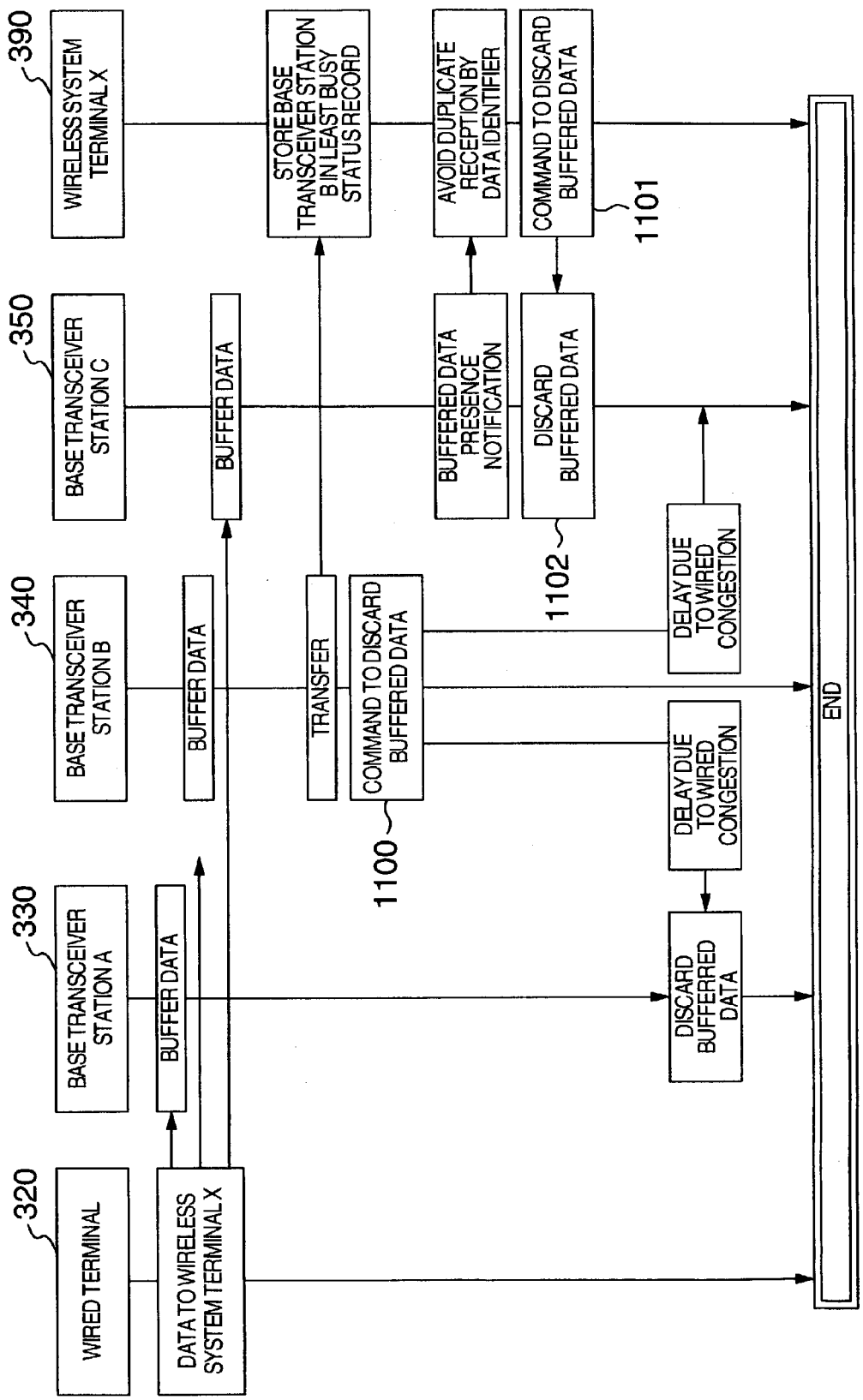
FIG. 13 is a flowchart showing a processing procedure for compound discarding of unnecessary data according to the wireless communication method in the embodiment of the present invention.

FIG. 13 is a processing procedure for "compound discarding of unnecessary data", which makes simultaneous use of the "commands to discard unnecessary data at transferring base transceiver stations" and the "discarding of unnecessary data using the data identifier". Data transmission by the wired terminal 320 to the wireless system terminal 390 using the compound discarding of unnecessary data will be described with reference to FIG. 13. Referring to FIG. 13, assume that before buffered data discard commands 1100 from the base transceiver station 340 arrive at the multilink base transceiver stations 330 and 350 and buffered data are discarded, the multilink base transceiver station 350 communicates with the wireless system terminal 390. Then, the wireless system terminal 390 will get duplicate reception. Then, the "compound discarding of unnecessary data" is employed so as to avoid the duplicate reception by using identifier table of the wireless system terminal. In this method, however, issue of the buffered data discard command 1101 or a step of buffering data 1102 may be omitted.

§Section 5: An example of Data Transmission from a Wireless System Terminal to a Base Transceiver Station.

Upload data transmission from a wireless system terminal to a base transceiver station will be described with reference to FIG. 5. The wireless system terminal 390 determines the multilink base transceiver station in the least busy status record 392 to be in the least busy, so that data transmission to the base transceiver station 330 alone is performed. Next, the following two upload data transmission methods will be described.

(1) Use of the "Busy Rate Checking Signal"

The busy rate checking by the "busy rate checking signal", described in the §3-1 Subsection, is executed. Upon selection of the least busy multilink base transceiver station, data transmission to the least busy multilink base transceiver station alone is performed.

(2) Concurrent Use of the "least busy status record" and the "busy rate checking signal".

When the least busy status record has been recorded within an arbitrarily-set reference period of time, the busy rate is determined from the least busy status record. When the least busy status record has been recorded for a period equal to or longer than the reference period of time, the least busy rate is determined from the busy rate checking. Then, upon selection of the least busy multilink base transceiver station, data transmission is performed to the least busy multilink base transceiver station alone.

As described above, according to the wireless communication method and the wireless communication system in this embodiment, a wireless system terminal is registered in a plurality of communicable base transceiver stations (multilink base transceiver stations) for connection. Then, just by switching a frequency for use, a single base transceiver station with a lower load and a more stable communication sensitivity (a lower busy rate) is selected according to the degree of the load (the busy rate) and the stability in the communication sensitivity of respective base transceiver stations, thereby performing data transmission and reception. Hence, when switching of base transceiver stations is performed, processing for roaming with a high overhead and a high load, as generated in the conventional arts, is not needed. Thus, achievement of communication load balance among base transceiver stations can be performed. Further, by selecting base transceiver stations with the communication sensitivity equal to or more than a certain level as multilink base transceiver stations, an improvement in stability in communication also becomes possible. An improvement in the throughput of the overall wireless communication system thereby becomes possible.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of controlling communication in a wireless communication system including a plurality of base transceiver stations and at least one wireless system terminal, each of the base transceiver stations being connected together via a wired network, the method comprising the steps of:

causing said at least one wireless system terminal to be each concurrently connected to at least two of the base transceiver stations that are connected together via said wired network; and causing said at least one wireless system terminal to perform data communication with one of said at least two base transceiver stations connected thereto.

2. The method of controlling communication according to claim 1, wherein the step of causing said at least one wireless system terminal to be concurrently connected to said at least two base transceiver stations comprises the steps of:

causing said at least one wireless system terminal to each measure a receiving signal strength of each of the base transceiver stations; and connecting said at least one wireless system terminal to said each of the at least two base transceiver stations when the receiving signal strength of said each of the at least two base transceiver stations is equal to or more than a predetermined level, and disconnecting said at least one wireless system terminal from said each of the at least two base transceiver stations when the receiving signal strength of said each of the at least two base transceiver stations is smaller than the predetermined level.

3. The method of controlling communication according to claim 1, further comprising the steps of:

detecting a communication load on each of the at least two base transceiver stations; and selecting one of the at least two base transceiver stations with a smallest communication load from among the at least two base transceiver stations;

wherein said at least one wireless system terminal performs wireless communication with said selected one of the at least two base transceiver stations with the smallest communication load.

4. The method of controlling communication according to claim 3, wherein detection of the communication load on said each of the at least two base transceiver stations is performed according to a period of time taken for said each of the at least two base transceiver stations to respond to transmission from said at least one wireless system terminal.

5. The method of controlling communication according to claim 3, wherein detection of the communication load on said each of the at least two base transceiver stations is performed according to a buffered data amount of a communication buffer of said each of the at least two base transceiver stations.

6. A method of controlling communication in a wireless communication system including a plurality of base transceiver stations and at least one wireless system terminal, each of the base transceiver stations being connected together via a wired network, the method comprising the steps of:

causing said at least one wireless system terminal to be each concurrently connected to at least two of the base transceiver stations that are connected together via said wired network;

causing each of said at least two base transceiver stations to buffer communication data to be transmitted to said at least one wireless system terminal connected in common; and causing one of said at least two base transceiver stations with a smallest communication load to transmit the buffered communication data to said at least one wireless system terminal connected thereto.

7. The method of controlling communication according to claim 6, further comprising the step of:

causing said at least one wireless system terminal that has received the buffered communication data from said one of said at least two base transceiver stations to transmit a signal commanding to discard the buffered communication data to each of said at least two base transceiver stations other than said one of said at least two base transceiver stations.

8. The method of controlling communication according to claim 6, further comprising the step of:

causing said one of said at least two base transceiver stations that has transmitted the buffered communication data to said at least one wireless system terminal to transmit a signal commanding to discard the buffered communication data to said each of said at least two base transceiver stations other than said one of said at least two base transceiver stations, connected to said at least one wireless system terminal.

9. The method of controlling communication according to claim 6, further comprising the step of:

performing transmission from said at least one wireless system terminal to said one of said at least two base transceiver stations that has transmitted the buffered communication data to said at least one wireless system terminal.

10. A method of controlling communication in a wireless LAN system including a plurality of base transceiver stations and at least one wireless system terminal, each of the base transceiver stations being connected together via a wired network, wherein the wireless LAN system includes a base transceiver station managing server for managing the base transceiver stations, and wherein the method comprises the steps of:

causing said at least one wireless system terminal to be each concurrently connected to at least two of the base transceiver stations that are connected together via said wired network;

causing the base transceiver station managing server to detect a communication load on each of the at least two base transceiver stations;

causing the base transceiver station managing server to select one of the at least two base transceiver stations that buffers communication data to be transmitted to said at least one wireless system terminal, based on the communication load on said each of the at least two base transceiver stations;

causing said one of the at least two base transceiver stations thus selected to buffer the communication data; and causing said one of the at least two base transceiver stations thus selected to transmit the buffered communication data to said at least one wireless system terminal.

11. A wireless LAN system comprising wireless system terminals and base transceiver stations, each of the base transceiver stations being connected together via a wired network, wherein each of the wireless system terminals is concurrently connected to at least two of the base transceiver stations that are connected together via the wired network, and wherein one of said at least two base transceiver stations performs wireless transmission and reception of communication data with said each of the wireless system terminals common to said at least two base transceiver stations other than said one of said at least two of base transceiver stations.

12. The wireless LAN system according to claim 11, wherein said each of the wireless system terminals includes a first link table in which a plurality of the base transceiver stations recognized as communicable are registered, wherein each of the base transceiver stations includes a second link table where a plurality of the wireless system terminals recognized as communicable are registered, and wherein one of the wireless system terminals is connected to the at least two base transceiver stations and selects one of the at least two base transceiver stations connected to said one of the wireless system terminals to perform wireless communication, said selected one of the at least two base transceiver stations and said one of the wireless system terminals connected thereto being registered in the corresponding first link table and second link table thereof, respectively.

13. The wireless LAN system according to claim 11, wherein said each of the wireless system terminals and each of the base transceiver stations respectively have a wireless communication unit for performing time-division concurrent communication, and wherein said each of the wireless system terminals is concurrently and wirelessly connected to said at least two base transceiver stations.

14. The wireless LAN system according to claim 11, wherein said each of the wireless system terminals and each of the base transceiver stations respectively have a wireless communication unit having a plurality of channels, and wherein said each of the wireless system terminals is concurrently and wirelessly connected to said at least two base transceiver stations.

15. The wireless LAN system according to claim 11, wherein each of said at least two base transceiver stations has a buffer for temporarily storing communication data to be transmitted to said each of the wireless system terminals, and wherein the communication data stored in the buffer of one of said at least two base transceiver stations with a small communication load is transmitted to said each of the wireless system terminals.

16. The wireless LAN system according to claim 15, wherein said each of the wireless system terminals that has received the communication data transmits to said each of said at least two base transceiver stations other than said one of said at least two of base transceiver stations that has transmitted the communication data a discard signal for clearing the buffer therein.

17. The wireless LAN system according to claim 16, wherein said each of the wireless system terminals performs wireless data transmission to said one of said at least two base transceiver stations from which said each of the wireless system terminals has received data immediately before the wireless data transmission.

18. A wireless LAN system including base transceiver stations and wireless system terminals, each of the base transceiver stations being connected together via a wired network, wherein each of the wireless system terminals is concurrently connected to at least two of the base transceiver stations comprising first and second base transceiver stations,
   wherein the wireless LAN system comprises a base transceiver station managing server for managing a communication load on each of the base transceiver stations that are connected together via the wired network, and
   wherein the base transceiver station managing server selects one of at least two of the base transceiver stations for relaying communication data to be transmitted to said each of the wireless system terminals according to the communication load on said each of the at least two base transceiver stations.

19. A wireless LAN system including a wireless system terminal, wherein the wireless system terminal comprises:
   a wireless communication unit concurrently connected to a plurality of base transceiver stations for buffering identical communication data to be transmitted to the wireless system terminal, each of the base transceiver stations being connected together via a wired network;
   a link table for storing the connected base transceiver stations that are connected together via the wired network; and
   a communication processing procedure unit for referring to the link table when receiving the communication data to be transmitted to the wireless system terminal from one of the connected base transceiver stations, and then sending a buffered data discard signal to each of the connected base transceiver stations other than said one of the base transceiver stations that has transmitted the communication data.

20. A wireless LAN system including base transceiver stations, each of the base transceiver stations being connected tog ether via a wired network, wherein each of the base transceiver stations comprises:
   a wireless communication unit concurrently connected to a plurality of wireless system terminals;
   a link table for storing the connected wireless system terminals;
   a buffer for temporarily storing communication data to be transmitted to each of the wireless system terminals stored in the link table, for said each of the wireless system terminals; and
   a communication processing procedure unit for clearing the buffer when receiving a discard signal from one of the wireless system terminals stored in the link table before the communication data stored in the buffer is transmitted to said one of the wireless system terminals.

* * * * *